F. LUTZ.
SIPHON VALVE.
APPLICATION FILED MAR. 21, 1910.

963,604.

Patented July 5, 1910.

WITNESSES:

INVENTOR
Ferdinand Lutz
BY
ATTORNEYS

UNITED STATES PATENT OFFICE.

FERDINAND LUTZ, OF NEW YORK, N. Y.

SIPHON-VALVE.

963,604.  Specification of Letters Patent.  Patented July 5, 1910.

Application filed March 21, 1910. Serial No. 550,659.

*To all whom it may concern:*

Be it known that I, FERDINAND LUTZ, a citizen of the United States, and a resident of the city of New York, borough of Manhattan, in the county and State of New York, have invented a new and Improved Siphon-Valve, of which the following is a full, clear, and exact description.

My invention relates to siphons, more particularly to siphon valves for water closets and the like, and has for an object to provide a valve for quickly creating a siphon for flushing purposes, which valve is durable and the action of which is simple and efficient.

For the purpose mentioned, use is made of a short leg and a long leg, having a connection therebetween, a cylinder on the connection, and means in the cylinder and the connection for creating a siphon.

Reference is to be had to the accompanying drawings forming a part of this specification, in which similar characters of reference indicate corresponding parts in both views, and in which—

Figure 1:
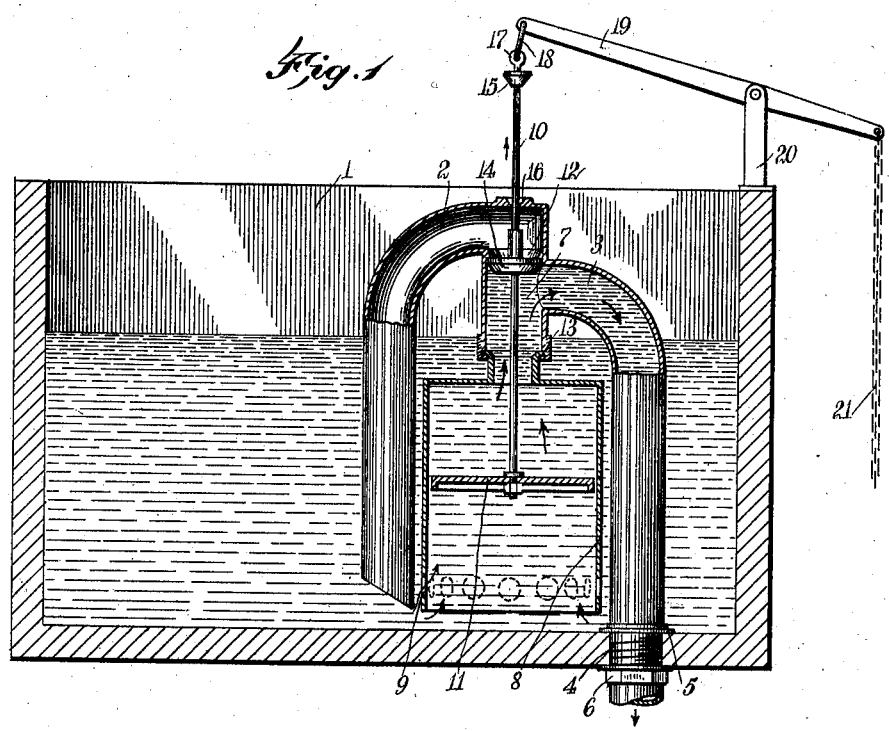
Figure 2:
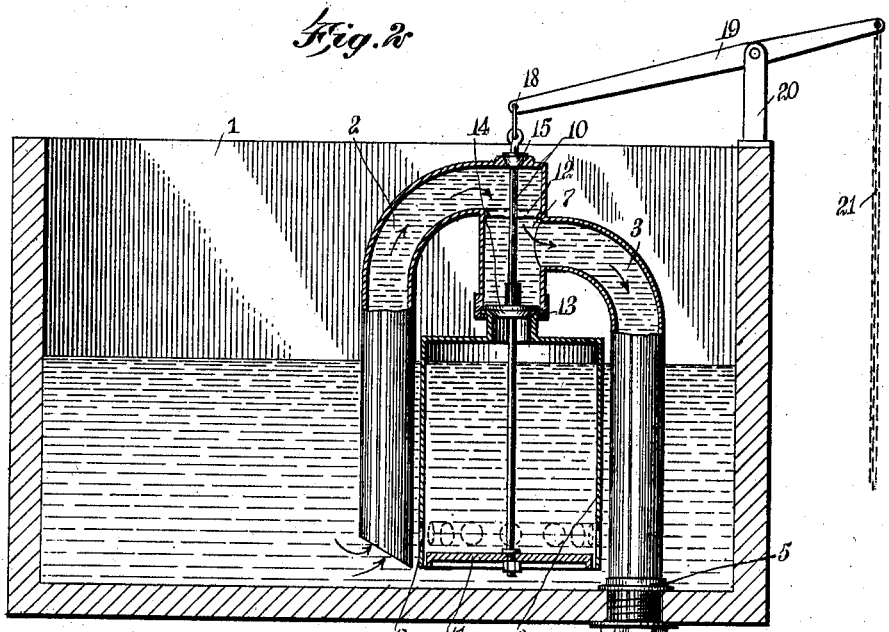

Figure 1 is a sectional side view of a flushing tank having my device mounted thereon and showing the same in the act of creating a siphon, parts of the device being broken away to disclose the underlying structure, and Fig. 2 is a similar view but showing my device in its final position after creating a siphon.

Referring more particularly to the views, I provide a flush tank 1, having mounted therein a short leg 2, and a long leg 3 connected to the tank at 4, and secured thereto by a suitable washer 5 and a lock nut 6. A connection 7 is shown intermediate the legs 2 and 3, and removably secured to the lower end thereof is a cylinder 8 provided with a series of perforations 9. A piston rod 10 is mounted on the short leg 2 and extends downwardly into the cylinder 8. At one end of the piston rod 10 a piston 11 is secured and adapted to slide in the cylinder 8. On the connection 7, in the upper part of the same, a valve seat 12 is provided, and on the cylinder 8, in the upper part of the same, a similar valve seat 13 is provided, the said valve seats preferably being beveled to snugly receive a beveled valve 14, slidably mounted on the piston rod 10, in the connection 7. A beveled stop lug 15 is rigidly mounted on the piston rod 10 at the upper end thereof, and is adapted to removably engage a beveled recess 16 of the short leg 2, as will be hereinafter more particularly described. In order to conveniently operate the piston rod 10, an eye 17 is formed in the upper end of the same, and mounted thereon, by means of a ring 18, is a lever 19, pivotally held on a bearing 20 secured to the tank 1, and the other end of the lever 19 is conveniently connected with a chain or cord 21.

The operation of my device is as follows: Supposing my device to be used in connection with closets, and the tank being full of water, as shown in Fig. 1, when it is desired to flush the closet the chain 21 is drawn downward, thereby raising the lever 19 and the piston rod 10. In view of the perforations 9 the cylinder 8 is filled with water, so that when the piston rod moves upwardly the piston moves likewise and the water in the cylinder is forced upwardly through the connection 7. When the device is in its normal position, the valve 14 seats on the valve seat 13, but owing to the force of water pressing against the valve 14 when the piston moves upward, the valve 14 is forced to the upper part of the connection 7 and against the valve seat 12, thereby closing the entrance to the pipe or leg 2 and causing the water above the piston 11 to move outwardly through the pipe 3, connected with a flushing pipe in engagement with a closet. Now, when sufficient water has passed out of the cylinder 8 and connection 7, and the pressure is decreased, the valve 14, owing to its weight, will drop to the valve seat 13 at the upper end of the cylinder, and the suction caused by this movement will draw a stream of water from the tank 1 up through the leg 2 and, as the valve 14 has closed the entrance to the cylinder 8, the water will pass down through the leg 3, as shown by arrows in Fig. 2, and a siphon is created, which will continue until all the water is exhausted from the tank, thereby thoroughly flushing the closet. In order to limit the fall of the piston 11 in the cylinder 8, the beveled stop lug 15 is provided to removably engage the beveled recess 16.

It will be understood, that although I have shown a particular construction for the purpose of describing my device, the scope of my invention is clearly defined in the appended claims.

Having thus described my invention, I claim as new and desire to secure by Letters Patent:

1. A siphon valve comprising a short leg and a long leg, a connection therebetween, a perforated cylinder secured to the connection, a piston rod extending into the cylinder, a piston on the rod, and means slidably mounted on the rod and adapted to operate in the connection.

2. A siphon valve comprising a short leg and a long leg, a connection therebetween, a perforated cylinder secured to the connection, a piston rod extending into the cylinder, a piston on the rod, a stop lug on the rod, and means slidably mounted on the rod and adapted to operate in the connection.

3. A siphon valve comprising a short leg and a long leg, a connection therebetween, a perforated cylinder removably secured to the connection, a piston rod extending into the cylinder, a piston on the rod, a stop lug on the rod, and conical-shaped means slidably mounted on the rod and adapted to operate in the connection.

4. A siphon valve comprising a short leg and a long leg, a connection therebetween, a perforated cylinder removably secured to the connection and intermediate the two legs, a piston rod extending into the cylinder, a piston on the rod and disposed in the cylinder, and conical-shaped means slidably mounted on the rod and adapted to operate in the connection.

5. A siphon valve comprising a short leg and a long leg, a connection therebetween, a perforated cylinder secured to the connection, a piston rod extending into the cylinder, a piston on the rod, a valve seat on the connection, and means slidably mounted on the rod and adapted to removably engage the valve seat.

6. A siphon valve comprising a short leg and a long leg, a connection therebetween, a perforated cylinder secured to the connection, a piston rod extending into the cylinder, a piston on the rod, a valve seat on the connection, a second valve seat on the cylinder, and means slidably mounted on the rod and adapted to removably engage the said valve seats.

7. A siphon valve comprising a short leg and a long leg, a connection therebetween, a perforated cylinder secured to the connection, a piston rod extending into the cylinder, a piston on the rod, a stop lug on the rod, a valve seat on the connection, and means slidably mounted on the rod and adapted to removably engage the valve seat.

8. A siphon valve comprising a short leg and a long leg, a connection therebetween, a perforated cylinder secured to the connection, a piston rod extending into the cylinder, a piston on the rod, a stop lug on the rod, a valve seat on the connection, a second valve seat on the cylinder, and means slidably mounted on the rod and adapted to removably engage the said valve seats.

9. A siphon valve comprising a short leg and a long leg, a connection therebetween, a perforated cylinder secured to the connection, a piston rod mounted on the short leg and extending into the cylinder, a piston on the rod, a stop lug on the rod and adapted to engage the short leg, a valve seat on the connection, a valve seat on the cylinder, and conical-shaped means slidably mounted on the rod and adapted to removably engage the said valve seats.

10. A siphon valve comprising a short leg and a long leg, a connection therebetween, a perforated cylinder secured to the connection, a piston rod extending into the cylinder, a piston on the rod, and a valve slidably mounted on the rod and adapted to operate in the connection.

11. A siphon valve comprising a short leg and a long leg, a connection therebetween, a perforated cylinder secured to the connection, a piston rod extending into the cylinder, a piston on the rod, a stop lug on the rod, and a valve slidably mounted on the rod and adapted to operate in the connection.

12. A siphon valve comprising a short leg and a long leg, a connection therebetween, a cylinder mounted on the connection, a piston rod extending into the cylinder, a piston on the rod, a valve seat on the connection, a second valve seat on the cylinder, and a valve slidably mounted on the rod and adapted to removably engage the said valve seats.

13. A siphon valve comprising a short leg and a long leg, a connection therebetween, a perforated cylinder removably mounted on the connection, a piston rod mounted on the connection, a piston rod mounted on the short leg and extending into the cylinder, a piston on the rod, a stop lug on the rod and adapted to engage the short leg, a valve seat on the connection, a second valve seat on the cylinder, and a valve slidably mounted on the rod and adapted to removably engage the said valve seats.

14. In combination, a flushing tank, a short leg disposed in the tank, a long leg in the tank and connected thereto, a connection between the two legs, a perforated cylinder removably engaging the connection, a piston rod mounted on the short leg and extending into the cylinder, a piston on the rod, valve seats in the connection, a stop lug on the rod and adapted to engage the short leg, means exterior of the cylinder for operating the piston, and a valve slidably mounted on the rod and adapted to removably engage the said valve seats.

In testimony whereof I have signed my name to this specification in the presence of two subscribing witnesses.

FERDINAND LUTZ.

Witnesses:
F. A. HOSTER,
PHILIP D. ROLLHAUS.